United States Patent [19]

Nishikawa et al.

[11] Patent Number: 4,713,287

[45] Date of Patent: Dec. 15, 1987

[54] MAGNETIC RECORDING MEDIUM

[75] Inventors: Yasuo Nishikawa; Tsutomu Okita; Yoshito Mukaida, all of Kanagawa; Masahiro Niinomi, Tokyo; Kenji Yanagihara, Tokyo; Mituo Kimura, Tokyo, all of Japan

[73] Assignees: Fuji Photo Film Co., Ltd., Kanagawa; Japan Synthetic Rubber Co., Ltd., Tokyo, both of Japan

[21] Appl. No.: 654,288

[22] Filed: Sep. 25, 1984

[30] Foreign Application Priority Data

Sep. 26, 1983 [JP] Japan ................. 58-176387

[51] Int. Cl.$^4$ .............................. G11B 5/72
[52] U.S. Cl. ..................... 428/336; 427/131; 428/340; 428/421; 428/694; 428/900; 428/463; 428/695
[58] Field of Search ............ 428/421, 422, 900, 694, 428/695, 336, 340, 463; 427/131, 128, 132; 360/134–136

[56] References Cited

U.S. PATENT DOCUMENTS

| | | | |
|---|---|---|---|
| 3,490,946 | 1/1970 | Wolff | 428/422 |
| 3,993,824 | 11/1976 | Shirahata | 428/900 |
| 4,188,434 | 2/1980 | Loran | 428/422 |
| 4,390,601 | 6/1983 | Ono | 428/900 |
| 4,419,404 | 12/1983 | Arai | 427/131 |
| 4,443,514 | 4/1984 | Yamamoto | 428/694 |
| 4,486,500 | 12/1984 | Naruo | 428/695 |
| 4,521,482 | 6/1985 | Arai | 428/412 |
| 4,522,885 | 6/1985 | Funahashi | 428/422 |

Primary Examiner—Ellis P. Robinson
Attorney, Agent, or Firm—Sughrue, Mion, Zinn, Macpeak & Seas

[57] ABSTRACT

A magnetic recording medium is described, comprising a support having provided thereon a thin magnetic metal film, and a thin layer consisting essentially of at least one fluorinated polymer selected from 1,1-difluoroethylene polymer 1,1,2-trifluoroethylene polymer and the copolymer thereof being provided on at least one of the surface of the thin magnetic metal film and the surface of the support opposite to the thin magnetic metal film.

17 Claims, No Drawings

MAGNETIC RECORDING MEDIUM

FIELD OF THE INVENTION

The present invention relates to a magnetic recording medium comprising a magnetic recording layer of a thin magnetic film, and more particularly it relates to a thin metal film type magnetic recording medium having excellent running properties, wear resistance, and electromagnetic properties.

BACKGROUND OF THE INVENTION

A coated type magnetic recording medium that has been widely used is prepared by providing a non-magnetic support with a magnetic recording layer containing magnetic particles of oxides such as $\gamma\text{-}Fe_2O_3$, Co-doped $\gamma\text{-}Fe_2O_3$, $Fe_3O_4$, Co-doped $Fe_3O_4$, a Bertholide compound of $\gamma\text{-}Fe_2O_3$ and $Fe_3O_4$, or $CrO_2$, and ferromagnetic alloy particles which are dispersed in an organic binder such as a copolymer of vinyl chloride-vinyl acetate, a copolymer of styrene-butadiene, an epoxy resin or a polyurethane resin, followed by drying the magnetic recording layer. Recently, attention has been directed to a magnetic recording medium of a thin metal film type comprising a magnetic recording layer of a thin ferromagnetic metal film prepared by a method wherein the film is formed in a vacuum chamber, such as by vacuum deposition, sputtering, or ion-plating, or by a metal plating method such as electro-plating or electroless plating, and has become of great commercial value with increasing demand for high density recording.

The conventional coated type magnetic recording medium uses mainly magnetic particles of metal oxides having low saturation magnetization. Therefore, when the magnetic recording layer is made thinner to realize high density recording, output of signals is decreased. On the other hand, in a magnetic recording medium of a thin metal film type, a ferromagnetic metal having higher saturation magnetization than magnetic oxides is used, and without using a non-magnetic substance such as a binder, the metal film can be fabricated to form an extremely thin magnetic recording layer. Accordingly, the electromagnetic properties thereof are excellent.

However, the magnetic recording medium of a thin metal film type has serious problems in that (1) friction resistance with parts such as a magnetic head or a guide pole is high upon recording, replaying, and erasing magnetic signals, and therefore wear resistance is not good, (2) the magnetic medium easily corrodes at high temperature and high humidity (e.g., at 40° C. and 80 RH %) and (3) the magnetic recording layer is easily damaged by shock during handling.

It has been proposed to provide a protective layer on the magnetic recording medium of a thin metal film type to solve the above problems.

One such proposal is disclosed in Japanese Patent Application (OPI) No. 75001/75, and involves coating a lubricating agent on the surface of a thin metal film. In accordance with this method, the friction coefficient between a magnetic head or a guide pole and a thin metal film decreases, running properties of the tape become more stable and scratches are not easily formed. However, those effects abruptly decrease when a tape is used repeatedly.

It has also been known, as described in Japanese Patent Application (OPI) Nos. 39708/78 and 40505/78 that a protective layer such as a metal layer or a metal oxide layer can be formed on a thin metal film to lubricate it. In this case, the effect of the protective layer does not last long. When a tape of such a thin metal film type is repeatedly used, the friction coefficient abruptly increases, and the thin magnetic metal film tends to be easily damaged.

Another proposal, as disclosed in Japanese patent application (OPI) No. 155010/79 is that a film of a high molecular weight substance be overcoated on the thin metal film layer. In this method, when a high molecular weight substance such as a conventionally known copolymer of vinylidene chloride and acrylate is used, the thickness of the film is necessarily about 0.2 $\mu$m, causing a spacing loss which unfavorably causes decreases output for high density recording.

It is often the case that an extremely smooth support for a thin magnetic metal film is used for high density recording. However in this case, running properties, particularly under highly humid conditions, and wear resistance are not satisfactory.

SUMMARY OF THE INVENTION

An object of the present invention is to provide a magnetic recording medium of a thin metal film type having excellent running properties, wear resistance and electromagnetic properties, and particularly to provide a magnetic recording medium of a thin metal film type having excellent long-lasting running properties and wear resistance.

As a result of extensive investigations of magnetic recording media of the thin metal film type, it has now been found that a magnetic recording medium comprising a support having thereon a thin magnetic metal film and having excellent long-lasting electromagnetic properties, running properties, wear resistance, and scratch resistance can be prepared by providing a thin layer consisting essentially of at least one compound selected from a 1,1-difluoroethylene polymer (hereinafter referred to as "poly(vinylidene fluoride)"), 1,1,2-trifluoroethylene polymer (hereinafter referred to as "poly(ethylene trifluoride)") and a copolymer of 1,1-difluoroethylene ($CF_2=CH_2$) and 1,1,2-trifluoroethylene ($CF_2=CFH$) (hereinafter those three compounds are collectively referred to as the "fluorinated polymer(s)") on at least one of the surface of a thin magnetic metal film and the surface of the support opposite to the side to which the thin magnetic metal film is formed (hereinafter referred to as the "opposite surface of the support").

Furthermore, it has been found that the above effects become even more remarkable when a lubricating layer is additionally provided on the thin layer of said compounds.

DETAILED DESCRIPTION OF THE INVENTION

The method for preparing a thin magnetic metal film which is suitable in the present invention can be a method wherein a film is formed in a vacuum chamber or a metal plating method. The method wherein a film is formed in a vacuum chamber is preferred, because it has such advantages that a thin metal film can be formed quickly, the process for preparing the same is simple and treatment for waste solution can be eliminated. According to the method wherein a film is formed in a vacuum chamber, a substance or a compound to be extracted is evaporated or ionized in a thin gas or in a vacuum air to extract out on a support. This method comprises vacuum deposition, sputtering, ion plating, or chemical phase metal plating methods, as described in, for example, U.S. Pat. Nos. 3,342,632 and 3,342,633.

A ferromagnetic metal layer of a magnetic recording layer of the present invention is prepared in a vacuum bath or by a metal plating method using ferromagnetic metal such as iron, cobalt, nickel, and the like, or a ferromagnetic alloy such as Fe-Co, Fe-Ni, Co-Ni, Fe-Si, Fe-Rh, Co-P, Co-B, Co-Si, Co-V, Co-Y, Co-La, Co-Ce, Co-Pr, Co-Sm, Co-Pt, Co-Mn, Fe-Co-Ni, Co-Ni-P, Co-Ni-B, Co-Ni-Ag, Co-Ni-Na, Co-Ni-Ce, Co-Ni-Zn, Co-Ni-Cu, Co-Ni-W, Co-Ni-Re, Co-Sm-Cu and the like. The thickness of the film is generally from 0.05 $\mu m$ to 2 $\mu m$, and preferably from 0.1 $\mu m$ to 0.4 $\mu m$.

A fluorinated polymer used in the present invention is prepared using 1,1-difluoroethylene and 1,1,2-trifluoroethylene in any ratio (one of them can be 100%) by a solution polymerization, an emulsion polymerization, a suspension polymerication, or a bulk polymerization in the presence of a radical catalyst such as azo compounds, peroxides, etc. Generally, a fluorinated polymer can be prepared as particles by introducing the fluorinated olefin i.e., 1,1-difluoroethylene and/or 1,1,2-trifluoroethylene, a radical catalyst, water or a solvent, and an additive such as an emulsifying agent into a pressure resisting autoclave and polymerizing it at a predetermined temperature for a predetermined period of time. The average molecular weight of the fluorinated polymer is preferably 5,000 or more, and more preferably 10,000 or more.

A thin layer of the fluorinated polymer is formed on at least one of the surface of a thin magnetic metal film or on the opposite surface of the support by dissolving a fluorinated polymer in an organic solvent, or emulsifying the polymer, followed by coating and drying. Concentration of the coating composition is generally from 0.05 to 5 wt %, and the coating amount is adjusted in such a manner that the dry thickness of the thin layer generally is from 0.5 to 100 nm, preferably from 1 nm to 50 nm, and more preferably from 2 nm to 20 nm.

Organic solvents used for coating a fluorinated polymer of the present invention include ketones such as acetone, methyl ethyl ketone, acetovinyl phenone, actyl acetone or cyclohexanone; esters such as methyl acetate or methyl acrylate; lactones such as $\gamma$-propyolactone or $\gamma$-butyrolactone; amides such as dimethyl formamide, dimethyl acetamide or n-methyl pyroyidone; amines such as diethylene triamine, N-N dimethylaminopropylamine or pyridine; or cyclic ethers such as ethylene oxide, propylene oxide, tetrahydrofuran or dioxane.

The thin layer of the fluorinated polymer may contain upto 30 wt % of other compounds, if desired, such as polyurethane resins, a copolymer of vinyl chloride-vinyl acetate, cellulose derivatives (e.g., nitrocellulose, cellulose acetate, etc.), polyvinyl chloride, polyvinylidene chloride, polyesters, polyamides and the like.

In the present invention, when a lubricating agent is coated on a thin layer of the fluorinated polymer the effects of the present invention are further improved. Such lubricating agents include a fatty acid, a metal soap, a fatty acid amide, a fatty acid ester, animal or vegetable oil such as mineral oil or whale oil, higher alcohol, silicone oil, electro-conductive particles such as graphite, inorganic particles such as molybdenum disulfide or tungsten disulfide, plastic particles such as polyethylene, polypropylene, a copolymer of ethylene and vinyl chloride or polytetrafluoroethylene, $\alpha$-olefin polymerization product, an unsaturated aliphatic hydrocarbon which is liquid at room temperature (the number of carbon atoms is about 20), fluorocarbons, and mixtures thereof.

The preferred lubricating agents include a fatty acid, a metal soap, a fatty acid amide, a fatty acid ester, a higher alcohol, and mixtures thereof, and a fatty acid having 10 or more carobn atoms is particularly preferred.

An anti-corrosive agent as disclosed in U.S. Pat. No. 4,253,886 and Japanese patent application (OPI) No. 41204/78 and/or an anti-mold agent as disclosed in Japanese patent application OPI No. 122234/80 can be used together with the lubricating agent, if necessary.

A layer containing the lubricating agent is formed on the thin layer of fluorinated polymer by dissolving a lubricating agent in an organic solvent and coating, or spraying thereon, or the lubricating layer can be formed in the above-described vacuum chamber. The dry coating amount of a lubricating agent is generally from 0.5 to 100 mg/m$^2$, preferably from 0.5 to 50 mg/m$^2$, and more preferably from 1 to 20 mg/m$^2$.

In accordance with the present invention, the following effects can be obtained.

(1) When the magnetic recording medium of the present invention is used repeatedly on a tape deck, the increase of the coefficient of dynamic friction is extremely small. That is, running properties after repeated use are remarkably improved and wear resistance is also improved.

(2) Running properties after repeated use are excellent, even in the case wherein the surface of the thin magnetic metal film or the support is extremely smooth.

(3) The coefficient of dynamic friction is small and running properties are excellent, even under high humidity conditions.

(4) The electromagnetic properties of the magnetic recording medium of a thin magnetic metal film type are not decreased, because the thin layer containing a fluorinated polymer is extremely thin and the amount of a lubricating agent provided on the thin layer is very small. Corrosion and decrease of electromagnetic properties are hardly observed under high humidity conditions.

The present invention is illustrated in more detail by the following Examples and Comparative Examples, but is not limited thereto. In the Examples and Comparative Examples, all parts are by weight.

EXAMPLE 1

A cobalt magnetic thin film (thickness of the layer: 0.2 $\mu m$) was deposited by the oblique vapour deposition method on a polyethylene terephthalate film having a thickness of 20 $\mu m$ to prepare a magnetic tape. An electron beam evaporation source charged with cobalt having purity of 99.95% was used, and the oblique vapour deposition was conducted under vacuum degree of $5 \times 10^{-5}$ Torr so that the angle of incidence was 70°. Thereafter, the polymer coating compositions I to V having the following formulation were coated on the surface of the thin magnetic metal film (Sample Nos. 1-5) or the opposite surface of the support (Sample No. 6) to form a thin layer of fluorinated polymer having a dry thickness of 10 nm, followed by drying at 30° C. for 10 seconds to prepare six kinds of magnetic tapes.

Polymer coating composition I to III:

-continued

| | |
|---|---|
| Copolymer of 1,1-difluoroethylene and 1,1,2-trifluoroethylene (80/20, 50/50, 30/70 mole %, respectively) | 1.0 part |
| Methyl ethyl ketone | 200 parts |
| Polymer coating composition IV: | |
| Poly(1,1,2-trifluoroethylene) | 1.0 part |
| Methyl ethyl ketone | 200 parts |
| Polymer coating composition V: | |
| Copolymer of 1,1-difluoroethylene and 1,1,2-trifluoroethylene (99/1 mole %) | 1.0 part |
| N—dimethyl formaldehyde | 200 parts |

The polymer coating compositions were dissolved at 80° C.

Thus prepared magnetic tapes were slit to a width of ½ inch to prepare video recording tapes. The resulting samples were designated as Samples Nos. 1 to 6, wherein Sample No. 6 was prepared using the polymer coating composition I.

COMPARATIVE EXAMPLE 1

The same procedure as in Example 1 was repeated, except that only the cobalt magnetic thin film was deposited by an oblique vapour deposition method, to prepare Sample No. C-1.

COMPARATIVE EXAMPLE 2

The same procedure as in Example 1 was repeated except that the polymer coating composition VI was coated on the surface of the thin magnetic metal film instead of the polymer coating composition I, to prepare a video tape having a width of ½ inch, which was designated as Sample No. C-2.

| Polymer coating composition VI: | |
|---|---|
| Copolymer of 1,1-dichloroethylene and acrylate | 1.0 part |
| Methyl ethyl ketone | 200 parts |

COMPARATIVE EXAMPLE 3

The same procedure as in Comparative Example 2 was repeated except that the coating composition VII containing a lubricating agent was coated instead of the polymer coating composition VI to prepare a video tape Sample No. C-3 having a width of 1/2 inch.

| Coating composition VII: | |
|---|---|
| Myristic acid | 1.0 part |
| n-Hexane | 200 parts |

Durability of the film (wearing resistance) and values of coefficient of dynamic friction were determined with regard to the samples obtained in the above Examples and Comparative Examples in the following manner. (1) Durability Durability of the thin magnetic film was determined after the magnetic tape pressed on a magnetic head with tension of 90 g/ ½ inch had been run at a speed of 38 cm/second for 500 passes. The condition of scratches and scrape off of the magnetic tape was visually observed. (2) Coefficient of dynamic friction Sample tapes were replayed for 1, 20; 100 and 500 passes with a VHS type video tape recorder ("Maclord 88 (NV-8800-)" manufactured by Matsushita Electric Co., Ltd.) in which a tape tension for sending out the tape to be measured was $T_1$ and a tape tension for winding up it was $T_2$, and coefficient of dynamic friction ($\mu$) was calculated by the formula, $$T_2/T_1 = e^{\mu\pi}$$

The results of the evaluation are shown in Table 1.

With regard to the opposite surface of the support, the coefficient of dynamic friction was only determined on Sample No. 6 and Sample No. C-1 (the opposite surface thereof was designated as Sample No. C-4), and the results are also shown in Table 1.

TABLE 1

| Sample No. | Location of Layer | Layer provided | Durability after 500 passes | Coefficient of dynamic friction, after | | | |
|---|---|---|---|---|---|---|---|
| | | | | 1 pass | 20 passes | 100 passes | 500 passes |
| 1 | Surface of magnetic layer | 1,1-difluoroethylene/ 1,1,2-trifluoroethylene copolymer (80/20) | No scratches | 0.27 | 0.30 | 0.33 | 0.36 |
| 2 | Surface of magnetic layer | 1,1-difluoroethylene/ 1,1,2-trifluoroethylene copolymer (50/50) | " | 0.27 | 0.30 | 0.33 | 0.35 |
| 3 | Surface of magnetic layer | 1,1-difluoroethylene/ 1,1,2-trifluoroethylene copolymer (30/70) | " | 0.25 | 0.30 | 0.32 | 0.35 |
| 4 | Surface of magnetic layer | 1,1-difluoroethylene/ 1,1,2-trifluoroethylene copolymer (0/100) | " | 0.28 | 0.32 | 0.35 | 0.38 |
| 5 | Surface of magnetic layer | 1,1-difluoroethylene/ 1,1,2-trifluoroethylene copolymer (99/1) | " | 0.28 | 0.32 | 0.35 | 0.39 |
| 6 | Opposite surface of support | 1,1-difluoroethylene/ 1,1,2-trifluoroethylene copolymer (80/20) | — | 0.23 | 0.25 | 0.30 | 0.30 |
| C-1 | Surface of magnetic layer | none | Ten or more deep scratches | 0.48 | 0.55 | 0.58 | 0.67 |
| C-2 | Surface of magnetic layer | 1,1-dichloro- ethylene-acrylate copolymer | 4 or 5 shallow scratches | 0.31 | 0.38 | 0.42 | 0.50 |
| C-3 | Surface of magnetic layer | Myristic acid | About ten deep scratches | 0.30 | 0.33 | 0.41 | 0.48 |

TABLE 1-continued

| Sample No. | Location of Layer | Layer provided | Durability after 500 passes | Coefficient of dynamic friction, after | | | |
|---|---|---|---|---|---|---|---|
| | | | | 1 pass | 20 passes | 100 passes | 500 passes |
| C-4 | Opposite surface of support | none | — | 0.35 | 0.40 | 0.57 | 0.59 |

It is clear form the foregoing results of Table 1 that in the magnetic recording medium of a thin metal film type of the present invention, not only are running properties and wear resistnace remarkably improved, but also these effects are long-lasting. Therefore, the magnetic recording medium of the present invention is of high practical value.

EXAMPLE 2

Five kinds of magnetic tapes were prepared in the same manner as in the preparation of Sample Nos. 1–5 of Example 1. The following coating composition containing a lubricating agent was coated on these magnetic thin films to have the coated amount of 1 g/m², dried at 50° C. for 10 seconds. Each magnetic tape was slit to a width of ½ inch to prepare five kinds of video tapes of the present invention (designated as Sample Nos. 7–11, respectively).

| Coating composition containing a lubricating agent: | |
|---|---|
| Myristic acid | 1.0 part |
| n-Hexane | 200 parts |

For comparison, the magnetic tape prepared in the same manner as in Comparative Example 2 was provided with the layer containing the lubricating agent in the same manner as described above, and was slit to a width of ½ inch to prepare a video tape, which was designated as Sample No. C-5.

With regard to these Samples and Sample No. C-3 prepared in Comparative Example 3 (Sample No. C-3 was provided with a layer containing a lubricating agent on the thin magnetic metal film in the same manner as described above), the durability and coefficient of dynamic friction were measured in the same manner as described above, and the results are shown in Table 2.

TABLE 2

| Sample No. | Anti-corrosive effect after 500 passes | Coefficient of dynamic friction, after | | | |
|---|---|---|---|---|---|
| | | 1 pass | 20 passes | 100 passes | 500 passes |
| 7 | No scratches | 0.27 | 0.26 | 0.26 | 0.26 |
| 8 | " | 0.27 | 0.26 | 0.25 | 0.25 |
| 9 | " | 0.25 | 0.24 | 0.24 | 0.23 |
| 10 | " | 0.27 | 0.26 | 0.27 | 0.28 |
| 11 | " | 0.22 | 0.23 | 0.23 | 0.24 |
| C-5 | 2 or 3 shallow scratches | 0.30 | 0.32 | 0.39 | 0.45 |

All of the samples of the present invention exhibited better efficiency than that obtained in Example 1 and were far more improved than Sample C-5 and Sample C-3 (the result of Sample C-3 is shown in Table 1). It was also observed that these effects are long lasting.

While the invention has been described in detail and with reference to specific embodiment thereof, it will be apparent to one skilled in the art that various changes and modifications can be made therein without departing from the spirit and scope thereof.

What is claimed is:

1. A magnetic recording medium comprising a support having provided thereon a thin magnetic metal film, and a thin layer from 0.5 nm to 100 nm thick consisting essentially of at least one fluorinated polymer selected from 1,1-difluoroethylene polymer, 1,1,2-trifluoroethylene polymer and a copolymer of 1,1-diflurorethylene and 1,1,2-trifluoroethylene being provided on at least one of the surface of the thin magnetic metal film and on the surface of the support opposite to the thin magnetic metal film, wherein said fluorinated polymer is preformed, is then dissolved in an organic solvent or emulsified, and thereafter is applied to at least one of the surface of said thin magnetic metal and the surface of the support opposite to the thin magnetic film by coating and drying.

2. A magnetic recording medium as in claim 1, wherein a lubricating agent is coated on the thin layer consisting essentially of said fluorinated polymer, wherein the lubricating agent is provided in a dry coating amount of from 0.5 to 100 mg/m².

3. A magnetic recording medium as in claim 1, wherein the average molecular weight of the fluorinated polymer is 5,000 or more.

4. A magnetic recording medium as in claim 2, wherein the average molecular weight of the fluorinated polymer is 5,000 or more.

5. A magnetic recording medium as in claim 1, wherein the average molecular weight of the fluorinated polymer is 10,000 or more.

6. A magnetic recording medium as in claim 2, wherein the average molecular weight of the fluorinated polymer is 10,000 or more.

7. A magnetic recording medium is in claim 1, wherein the thin layer consisting essentially of said fluorinated polymer has a thickness of from 1 nm to 50 nm.

8. A magnetic recording medium in claim 2, wherein the thin layer consisting essentially of said fluorinated polymer has a thickness of 1 nm to 50 nm.

9. A magnetic recording medium as in claim 1, wherein the thin layer consisting essentially of said fluorinated polymer has a thickness of from 2 nm to 20 nm.

10. A magnetic recording medium is in claim 2, wherein the thin layer consisting essentially of said fluorinated polymer has a thickness of from 2 nm to 20 nm.

11. A magnetic recording medium as in claim 2, wherein the lubricating agent is provided in a dry coating amount of from 0.5 to 50 mg/m².

12. A magnetic recording medium as in claim 2, wherein the lubricating agent is provided in a dry coating amount of from 1 to 20 mg/m2.

13. A magnetic recording medium is in claim 2, wherein said lubricating agent is selectedfrom the group consisting of a fatty acid, a metal soap, L fatty acid amide, a fatty acid ester, a higher alcohol, or a mixture thereof.

14. A magnetic recording medium is in claim 2, wherein said lubricating agent is selected from the group consisting of a fatty acid, a metal soap, a fatty acid amide, a fatty acid ester, a higher alcoho, or a mixture thereof.

15. A magnetic recording medium is in claim 2, wherein the lubricating agent is a fatty acid having 10 or more carbon atoms.

16. A magnetic recording medium is in claim 2, wherein the lubricating agent is a fatty acid having 10 or more carbon atoms.

17. A magnetic recording medium as in claim 1, wherein the flurorinated polymer is formed by solution polymerization, emulsion polymerization, suspension polymerization or bulk polymerization in the presence of a radical catalyst.

* * * * *